(12) United States Patent
André-Jönsson et al.

(10) Patent No.: US 9,578,569 B2
(45) Date of Patent: Feb. 21, 2017

(54) TRANSFERRING A USER EQUIPMENT TO A RADIO ACCESS NETWORK WITH A DIFFERENT RADIO ACCESS TECHNOLOGY

(75) Inventors: Henrik André-Jönsson, Linköping (SE); Lena Melin, Vaxholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 105 days.

(21) Appl. No.: 14/233,240

(22) PCT Filed: Jul. 22, 2011

(86) PCT No.: PCT/SE2011/050964
§ 371 (c)(1),
(2), (4) Date: Jan. 16, 2014

(87) PCT Pub. No.: WO2013/015726
PCT Pub. Date: Jan. 31, 2013

(65) Prior Publication Data
US 2014/0146792 A1 May 29, 2014

(51) Int. Cl.
*H04W 36/14* (2009.01)
*H04W 36/00* (2009.01)
*H04W 88/06* (2009.01)

(52) U.S. Cl.
CPC ......... *H04W 36/14* (2013.01); *H04W 36/0022* (2013.01); *H04W 88/06* (2013.01)

(58) Field of Classification Search
CPC ............. H04W 88/06; H04W 36/0022; H04W 36/0027; H04W 36/0066; H04W 36/14; H04W 36/16; H04W 36/0005
See application file for complete search history.

(56) References Cited

U.S. PATENT DOCUMENTS

| 2004/0184439 | A1 | 9/2004 | Blanc et al. | |
| 2010/0172301 | A1 | 7/2010 | Watfa et al. | |
| 2010/0316034 | A1* | 12/2010 | Burbidge | H04W 36/0022 370/338 |
| 2011/0064054 | A1* | 3/2011 | Parsons | H04W 36/0033 370/331 |

(Continued)

FOREIGN PATENT DOCUMENTS

RU 2323544 C2 4/2008

OTHER PUBLICATIONS

International Preliminary Report on Patentability dated Jan. 28, 2014 for International Application No. PCT/SE2011/050964, International Filing Date: Jul. 22, 2011 consisting of 8-pages.

(Continued)

*Primary Examiner* — Joshua Kading
(74) *Attorney, Agent, or Firm* — Christopher & Weisberg, P.A.

(57) ABSTRACT

A network node (16) of a first radio access network is configured to transfer a user equipment (11) from the first radio access network to a second radio access network, wherein the second radio access network has a different radio access technology, RAT, than the first radio access network. The transfer is initiated when the network node receives an indication of an inactive period in an ongoing packet-switched data session from the user equipment, and the network node transfers the user equipment to the second radio access network as a result of said indication.

20 Claims, 12 Drawing Sheets

(56) References Cited

U.S. PATENT DOCUMENTS

| | | | | |
|---|---|---|---|---|
| 2011/0122862 | A1* | 5/2011 | Yun | H04L 12/5692 370/352 |
| 2011/0149908 | A1* | 6/2011 | Olsson et al. | 370/331 |
| 2011/0274038 | A1* | 11/2011 | Zhu et al. | 370/328 |
| 2012/0069817 | A1* | 3/2012 | Ling | H04W 36/14 370/331 |
| 2012/0258707 | A1* | 10/2012 | Mathias | H04W 36/30 455/426.1 |

OTHER PUBLICATIONS

"3rd Generation Partnership Project; Technical Specification Group Services and System Aspects; Circuit Switched (CS) fallback in Evolved Packet System (EPS); Stage 2 (Release 10)", 3GPP Standard; 3GPP TS 23.272, 3rd Generation Partnership Project (3GPP), Mobile Competence Centre ; 650, Route Des Lucioles ; F-06921 Sophia-Antipolis Cedex ; France, No. V10.3.1, Apr. 5, 2011 (Apr. 5, 2011), pp. 1-78, XP050477124, [retrieved on Apr. 5, 2011].

Ericsson: "Push UE back to LTE after CSFB/SRVCC", 3GPP Draft; S2-113113, 3rd Generation Partnership Project (3GPP), Mobile Competence Centre ; 650, Route Des Lucioles ; F-06921 Sophia-Antipolis Cedex ; France, vol. SA WG2, no. Naantali; 20110711, Jul. 5, 2011 (Jul. 5, 2011), XP050548440, [retrieved on Jul. 5, 2011].

Research in Motion UK Limited et al: "Reselection to E-UTRAN following CS fallback", 3GPP Draft; R2-101442_Reselectiontoeutranaftercsfb, 3rd Generation Partnership Project (3GPP), Mobile Competence Centre ; 650, Route Des Lucioles ; F-06921 Sophia-Antipolis Cedex ; France, vol. RAN WG2, no. San Francisco, USA; 20100222, Feb. 15, 2010 (Feb. 15, 2010), XP050421682, [retrieved on Feb. 15, 2010].

Ericsson et al: "Fast Return after CSFB", 3GPP Draft; S2-114637 Was 4580 Was 4545 23272 Fastreturn After CSFB, 3rd Generation Partnership Project (3GPP), Mobile Competence Centre ; 650, Route Des Lucioles ; F-06921 Sophia-Antipolis Cedex ; France, vol. SA WG2, no. Jeju Island; 20111010, Oct. 14, 2011 (Oct. 14, 2011), XP050549757, [retrieved on Oct. 14, 2011].

SA2: "LS on Fast Return after CSFB", 3GPP Draft; R3-112722_S2-114712, 3rd Generation Partnership Project (3GPP), Mobile Competence Centre ; 650, Route Des Lucioles ; F-06921 Sophia-antipolis Cedex ; France, vol. RAN WG3, no. San Francisco, USA; 20111114, Oct. 21, 2011 (Oct. 21, 2011), XP050542421, [retrieved on Oct. 21, 2011].

International_Search_Report dated Apr. 25, 2012 for International Application No. PCT/SE2011/050964, International Filing Date: Jul. 22, 2011 consisting of 5-pages.

3GPP TS 23.401 V10.3.0 (Mar. 2011) 3rd Generation Partnership Project; Technical Specification Group Services and System Aspects; General Packet Radio Services (GPRS) enhancements for Evolved Universal Terrestrial Radio Access Network (E-UTRAN) access (Release 10), Mar. 28, 2011, consisting of 278 pages.

3GPP TS 25.304 V10.0.0 (Mar. 2011) 3rd Generation Partnership Project; Technical Specification Group Radio Access Network; User Equipment (UE) procedures in idle mode and procedures for cell reselection in connected mode (Release 10), Mar. 29, 2011, consisting of 51 pages.

3GPP TS 25.413 V10.1.0 (Mar. 2011) 3rd Generation Partnership Project; Technical Specification Group Radio Access Network; UTRAN Iu interface Radio Access Network Application Part (RANAP) signalling (Release 10), Apr. 4, 2011, consisting of 425 pages.

3GPP TS 23.272 V10.3.1 (Apr. 2011) 3rd Generation Partnership Project; Technical Specification Group Services and System Aspects; Circuit Switched (CS) fallback in Evolved Packet System (EPS); Stage 2 (Release 10), Apr. 5, 2011, consisting of 78 pages.

3GPP TS 25.331 V10.3.1 (Apr. 2011) 3rd Generation Partnership Project; Technical Specification Group Radio Access Network; Radio Resource Control (RRC); Protocol specification (Release 10), Apr. 11, 2011, consisting of 1863 pages.

Russian Decision to Grant dated Apr. 24, 2015 for Russian National Stage Application Serial No. 2014106654/07, International Filing Date: Jul. 22, 2011 consisting of 17-pages.

* cited by examiner

Network node:

Network node:

UE:

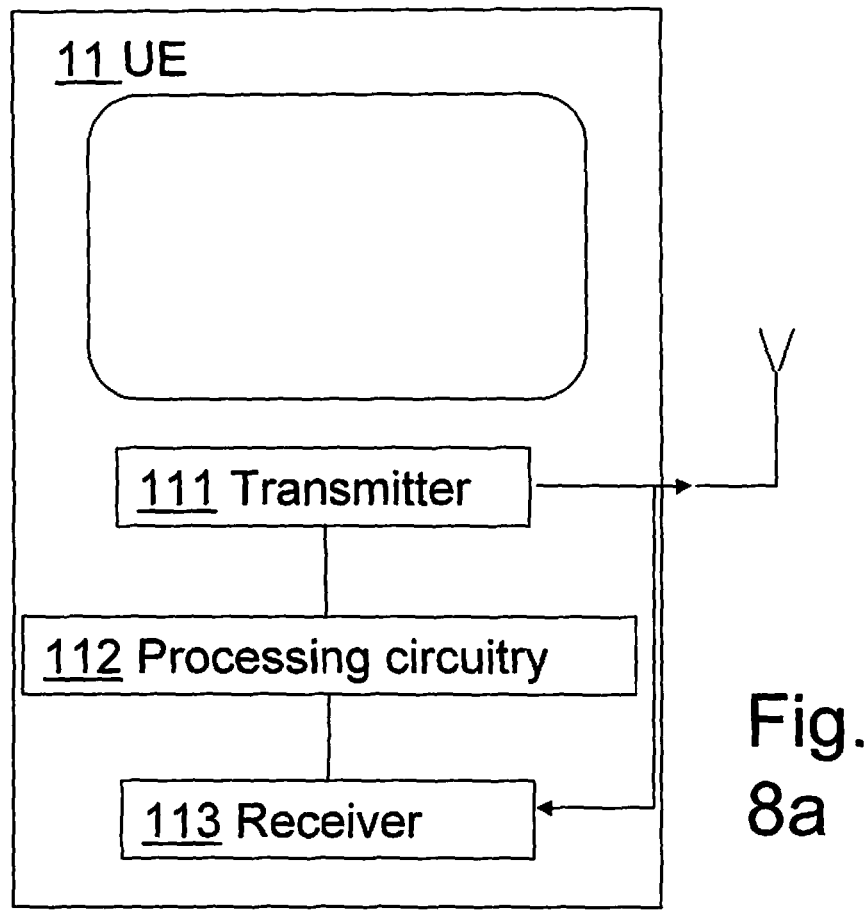
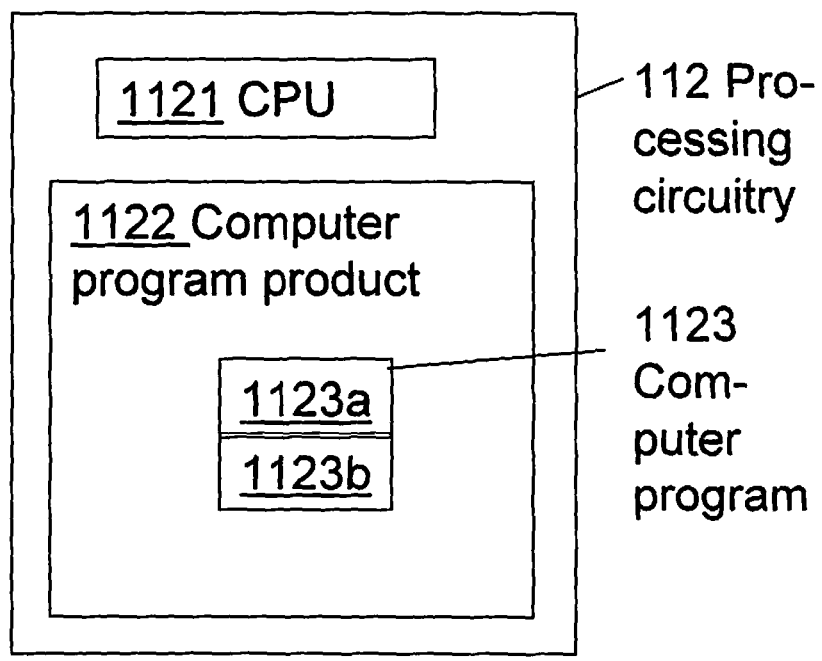

TRANSFERRING A USER EQUIPMENT TO A RADIO ACCESS NETWORK WITH A DIFFERENT RADIO ACCESS TECHNOLOGY

TECHNICAL FIELD

The disclosure relates to methods in a network node and in a user equipment of transferring the user equipment from a first radio access network to a second radio access network, the second access network having a different radio access technology than the first radio access network. The disclosure also relates to a network node and to a user equipment arranged to transfer the user equipment from a first radio access network to a second radio access network, the second access network having a different radio access technology than the first radio access network.

BACKGROUND

The 3GPP LTE (3rd Generation Partnership Project Long Term Evolution) is a project for improving the UMTS (Universal Mobile Telecommunication System)-standard, in order to cope with future requirements in terms of improved services, such as higher data rates, improved efficiency, and lower costs. The radio access network of an LTE system is commonly referred to as an E-UTRAN (Evolved Universal Terrestrial Radio Access Network), and the UTRAN is the radio access network according to the UMTS.

In a UTRAN, a user equipment, UE, is connected to a radio base station commonly referred to as a Node B, and the Node B is connected to a network node, typically an RNC (Radio Network Controller). The RNC is connected to a core network, which comprises both a circuit switched service domain and a packet switched service domain.

In a radio access network according to the $2^{nd}$ generation, e.g. a GERAN (Global System for Mobile communication, GSM, Edge Radio Access Network), the radio base station is referred to as a BTS (Base Transceiver Station), which is connected to a core network via a network node, typically a Base Station Controller (BSC), the core network also comprising both a circuit switched service domain and a packet switched service domain.

However, in the above-mentioned E-UTRAN, a UE is connected to a radio base station commonly referred to as an eNodeB (evolved NodeB), which is connected to the core network node, and the core network comprises only a packet switched service domain.

Thus, the E-UTRAN in the LTE uses a RAT (Radio Access Technology) that is not CS (Circuit Switched) capable. Instead, CS-based services, e.g. conventional circuit-switched voice calls, is replaced e.g. by VoIP in and LTE system.

For this reason, an LTE-capable UE that is attached to an E-UTRAN and wishes to initiate a CS service, e.g. a conventional voice call, has to transfer to a radio access network, RAN, with a CS-capable radio access technology, RAT, e.g. a UTRAN or a GERAN. Thus, the serving eNodeB will transfer the UE to a CS-capable radio access network in which the UE has radio coverage, and this RAN will provide the requested CS-service to the UE.

FIG. 1 schematically illustrates an UE 11 having an overlapping UTRA-radio coverage and E-UTRA-radio coverage. The figure shows a NodeB 14 of a UTRAN and an eNodeB 15 of an E-UTRAN. The NodeB 14 is connected to a network node of the UTRAN, i.e. an RNC 16, and the eNodeB is connected to a core network node 18. The UE 11 is located within an overlapping area of the UTRAN cell 12 and the E-UTRAN cell 13, wherein the UE may transfer from the E-UTRAN to the UTRAN, when it requests a CS service.

The transfer of the UE to the UTRAN due to the UE requesting a CS service could be performed e.g. according to a standardized CSFB (Circuit Switched Fall Back)-mechanism, which uses a PS HO (Packet Switched Hand Over) or a RRC Release operation. However, no specific mechanism is standardized for transferring the UE back to E-UTRAN after a CSFB, when the CS service has ended. Instead, when the CS service is terminated, and no PS (Packet Switched) session is ongoing, the UE is expected to go to Idle mode, and return to the E-UTRAN using e.g. a standardized LTE Cell Reselection. The Cell Reselection can also take place if the UE is in a CELL_PCH-state or in a URA_PCH-state, but not in a CELL_FACH-state.

Besides from the above-described situation, in which an LTE capable UE is connected to an UTRAN because a requested CS service is not available in E-UTRAN, other situations may exist in which an LTE capable UE may be connected to a UTRAN instead of to an E-UTRAN, such as e.g. when the UE does not have any LTE coverage, or due to operator strategies or load issues in the LTE network. However, when the reason for the connection to the UTRAN is not valid anymore, the UE should normally return to E-UTRAN as soon as possible.

Various methods exist for transferring a UE between two radio access network with different radio access technologies, such as e.g. from UTRAN to E-UTRAN, and different methods may apply for different UE states. The conventional method for a UE to transfer from a non-preferred RAT to the preferred RAT, in case the UE is in Idle mode or is connected on a common channel, is the above-mentioned LTE Cell Reselection, which requires that the UE is in the Idle mode, in a URA_PCH state or in a CELL_PCH state, i.e. that the UE has stopped transmitting data over the air, since the UE at this point is free to search for the most suitable available cell, with the highest prioritized radio access technology.

There is a need to improve handover between UTRAN and E-UTRAN.

SUMMARY

A UE that is provided with many applications that actively sends or receives data over the air may very seldom become idle or enter any of the PCH states, since it would result in a large signalling overhead if a connection should be created and released every time a small number of packets has been transmitted. For this reason, the connection will remain active for a short period after the latest transmission, in case the UE would have to transmit again, or if a packet has to be received by the UE. Thus, since the UE very seldom enters the idle mode or any of the PCH states, the UE may not transfer to the most preferred RAT, e.g. an E-UTRAN, and will remain connected, e.g. to the UTRAN, even though e.g. a requested CS service is terminated, and the UE has LTE radio coverage.

It is an object of exemplary embodiments described hereinafter to address at least some of the issues outlined above, and this object and others are achieved by the methods and the arrangements according to the appended independent claims, and by the embodiments according to the dependent claims.

A first aspect of exemplary embodiments provides a method in a network node for transferring a user equipment from the first radio access network to a second radio access network, the second radio access network having a different radio access technology, RAT, than the first radio access network. The method comprises the network node receiving a message from the user equipment, UE, the message comprising an indication of an inactive period in an ongoing packet-switched data session, and transferring the user equipment to the second radio access network as a result of said indication.

Said receiving may further comprise the network node receiving a further indication in a message from the user equipment, UE, the further indication indicating that the UE entered the first radio access network due to a circuit switched fallback, CSFB, and wherein said transferring of the UE to the second radio access network is further based on said received further indication.

Said further indication from the UE may be received in connection with the indication of an inactive period in an ongoing packet-switched data session, or in connection with the UE entering the first radio network, e.g. in an RRC Connection Request.

A second aspect of exemplary embodiments provides a method in a user equipment for transferring from a first radio access network to a second radio access network, the second radio access network having a different radio access technology, RAT, than the first radio access network. The method comprises the user equipment transmitting a message to a network node of the first radio access network, the message comprising an indication of an inactive period in an ongoing packet switched data session, and transferring to the second radio access network after receiving a transfer request from the network node of the first radio access network, said transfer request received as a result of said indication.

Said transmitting may further comprise the user equipment transmitting a further indication in a message to the network node of the first radio access network. This further indication indicates that the user equipment, UE, entered the first radio access network due to a circuit switch fallback, CSFB, and said transfer request, as received from the network node, is further based on said transmitted further indication.

Said further indication is transmitted to the network node in connection with the indication of an inactive period in an ongoing packet-switched data session, or in connection with the UE entering the first radio network, e.g. in an RRC Connection Request.

A third aspect of exemplary embodiments provides a network node connectable to a first radio access network, and arranged to transfer a user equipment from the first radio access network to a second radio access network. The second radio access network has a different radio access technology than the first radio access network. The network node comprises a receiver configured to receive a message from a user equipment, the message comprising an indication of an inactive period in an ongoing packet-switched data session, and a processing circuitry configured to transfer the user equipment to the second radio access network as a result of said indication.

Said receiver may be further configured to receive a further indication in a message from the user equipment, UE. This further indication indicates that the UE entered the first radio access network due to a circuit switched fallback, CSFB, and the processing circuitry is further configured to transfer the UE to the second radio access network based on said received further indication.

Said receiver may be configured to receive said further indication in connection with the indication of an inactive period in an ongoing packet-switched data session, or in connection with the UE entering the first radio network, e.g. in an RRC Connection Request.

A fourth aspect of exemplary embodiments provides a user equipment connectable to a first radio access network and to a second radio access network, and arranged to be transferred from the first radio access network to the second radio access network by a network node of the first radio access network. The second radio access network has a different radio access technology than the first radio access network. The user equipment comprises the following:

a transmitter configured to send a message to a network node of the first radio access network, the message comprising an indication of an inactive period in an ongoing packet switched data session;

a receiver configured to receive a transfer request from the network node to transfer to the second radio access network, the transfer request received as a result of said indication, and a processing circuitry configured to transfer the user equipment, UE, to the second radio access network after receiving the transfer request.

The transmitter may be further configured to send a further indication in a message to the network node of the first radio access network. The further indication indicates that the user equipment, UE, entered the first radio access network due to a circuit switch fallback, CSFB, and said transfer request, as received from the network node, is further based on said further indication.

Said transmitter may be configured to send said further indication in connection with the indication of an inactive period in an ongoing packet data session, or in connection with the UE entering the first radio access network, e.g. in an RRC Connection request.

It is an advantage with exemplary embodiments to enable a fast return of a UE to a radio access network with a preferred RAT, e.g. back to E-UTRAN from UTRAN, when a requested CS service has ended, even during an ongoing packet-switched data session. By using the fact that the UE has knowledge of ongoing data applications, the UTRAN is able to transfer the UE back to E-UTRAN, without having to wait for the PS data session to end. Further, since the UE selects a suitable point in time for transferring to E-UTRAN, the disturbance for the end user will be reduced. Another advantage is that this fast return of the UE could be accomplished at least partly by using existing mechanism.

BRIEF DESCRIPTION OF THE DRAWINGS

Exemplary embodiments will now be described in more detail, and with reference to the accompanying drawings, in which:

FIGS. 8a and 8b illustrate schematically a user equipment, according to an exemplary embodiment.

DETAILED DESCRIPTION

Figure 1:
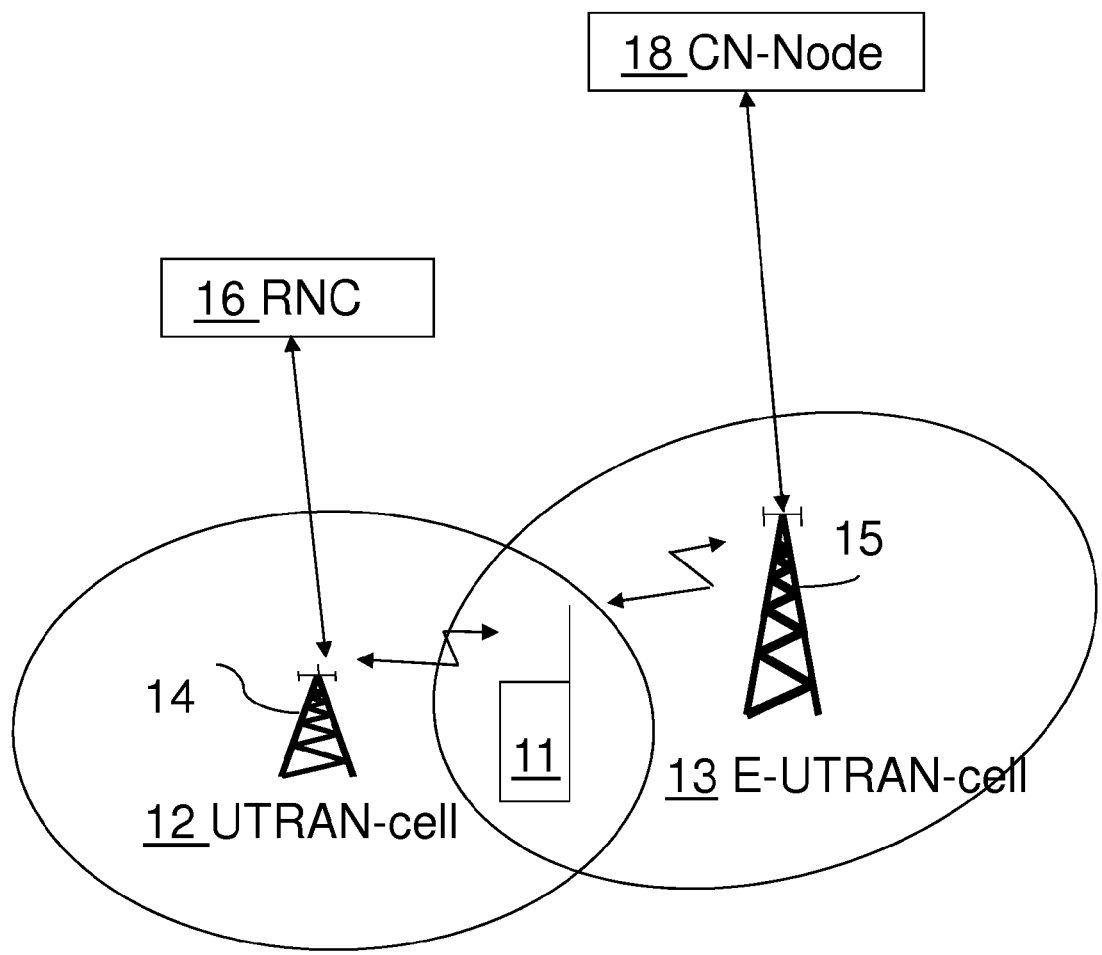
FIG. 1 schematically illustrates an exemplary architecture for a UE having an overlapping radio coverage in a UTRAN and in an E-UTRAN.

In the following description, different exemplary embodiments are described in more detail, with reference to accompanying drawings. For the purpose of explanation and not limitation, specific details are set forth, such as particular scenarios and techniques in order to provide a thorough understanding.

Moreover, it is apparent that the functions and means explained below may be implemented using software functioning in conjunction with a programmed microprocessor or general purpose computer, and/or using an application specific integrated circuit (ASIC). Further, while the embodiments are primarily described in the form of methods and devices, the embodiments may also be implemented as a computer program product or in a system comprising a computer processor and a memory coupled to the processor, wherein the memory is encoded with one or more programs that may perform the functions disclosed herein.

Furthermore, particular aspects of the embodiments are described in a non-limiting general context in relation to a transfer between an E-UTRAN and a UTRAN. However, it should be noted that the embodiments may also be applied to a transfer between other types of radio access networks. The user equipments described herein may include e.g. mobile telephones, pagers, headsets, laptop computers and other mobile terminals.

Besides the LTE Cell Reselection described in the Background, other existing mobility mechanisms may be suitable for transferring a user equipment to another radio access network with a different radio access technology, e.g. to a E-UTRAN from a UTRAN, and these mechanisms include e.g. the standardized RWR (RRC Release with Redirect) and the standardized PSHO (Packet-Switched Handover).

A PSHO is initiated by a network node in a radio access network, e.g. by an RNC in the UTRAN, and it involves moving a connected UE to another radio access network with only a very short interruption of the data transfer. However, the PSHO is not a mandatory UE capability, and is only supported by some UEs.

An RWR is also initiated by a network node in the radio access network, e.g. by the RNC in an UTRAN, but it will interrupt all data traffic to/from the UE, wherein the UE may enter Idle mode, and search for a radio access network with the highest prioritized radio access technology, RAT. Since all data traffic is interrupted, a RWR should only be sent at certain instances, in order to not interrupt an important ongoing data session. However, the UTRAN is not application aware, and can not predict when the UE intends to send the next data burst. Thus, the UTRAN does not know when it is suitable to send the RWR in order to avoid interrupting a data session. Further, the UE may have been configured with dedicated priorities by the LTE system, e.g. regarding load sharing, and the dedicated priorities may cause the UE to return to the UTRAN again, if it is transferred to the E-UTRAN.

Both the RWR and the PSHO are network-initiated mechanisms, and currently the radio access network will initiate an RWR or a PSHO when a UE experiences a bad coverage, or when a UE requests a service that is not available. However, this is not applicable e.g. for a transfer back to E-UTRAN after a CSFB, since this is not a service request, and the UTRAN radio coverage is normally good.

As mentioned above, the UTRAN is not able to predict when a user equipment will send the next data burst in an ongoing data session. However, the user equipment is aware of the ongoing data sessions, and also knows when to expect the next data burst. For this reason, a user equipment could inform the UTRAN when a transfer to E-UTRAN would be suitable in order to minimize any disturbance for the end user, by indicating an inactive period in an ongoing packet-switched data session to the UTRAN, i.e. that the user equipment does not expect to send or receive an packet-switched data for a while. This indication could be included e.g. in an existing RRC SIGNALLING CONNECTION RELEASE INDICATION, using a suitable existing cause value, or a new cause value.

A user equipment may predict when to expect the next data burst in different ways, depending e.g. on the capability of the user equipment. For example, a user equipment may have knowledge of all executing applications, and may be able to keep track of and predict when the applications will send or receive data packets. A user equipment could have several applications running in the background, and some of them may only send occasional data bursts. Thus, in case the user equipment is able to predict when each of the applications is expected to send or receive data packets, it could also predict when an inactive period will take place in an ongoing packet switched data session of the applications. Methods based on different traffic priorities where a user equipment may cache or delay network requests from different applications to group several accesses into a single network access are also possible. Alternatively, a user equipment may use statistical methods to predict when no packet-switched data is expected.

According to exemplary embodiments described hereinafter, a user equipment connected to a first radio access network will indicate an inactive period in an ongoing packet switched data session message to a network node of the radio access network. Accordingly, the network node, e.g. an RNC in an UTRAN, will transfer a user equipment to a second radio access network with different radio access technology, e.g. to an E-UTRAN, when the network nodes receives the indication from the user equipment.

According to an exemplary embodiment, the radio access technology of the first radio access network, e.g. an UTRAN, is CS-capable, and the radio access technology of the second radio access network, e.g. an E-UTRAN is not CS-capable.

According to a further exemplary embodiment, in case the user equipment entered the first radio access network due to a circuit switched fallback from the second radio access network, the user equipment will also indicate to the network node of the first radio access network that the entry was caused by a circuit switched fallback. An advantage with this exemplary embodiment is to distinguish an entry due to a circuit switched fallback from the case when a user equipment has been transferred to the UTRAN from an E-UTRAN due to a load-sharing mechanism implemented in the LTE, and in which case the UE should not be transferred back to E-UTRAN until the overload condition has ended.

According to an exemplary embodiment, the user equipment will send this CSFB indication in connection with the indication of an inactive period of an ongoing PS data session, e.g. by sending both indications in the same message. The message could be the existing RRC SIGNALLING CONNECTION RELEASE INDICATION, including a suitable new combined cause value.

According to an alternative exemplary embodiment, the user equipment sends a CSFB indication to the network node of the first radio access network, in connection with its entry into the first radio access network. Conventionally, when a UE enters UTRAN by CSFB with PSHO, the UTRAN will be informed by a RANAP RELOCATION REQUEST from the core network, the request including an IE indicating CSFB. No standardized mechanism exists for the case when the UE enters UTRAN by RWR. However, the UE performs an RRC Establishment-procedure as soon as it enters UTRAN, and according to an exemplary embodiment, the RRC Establishment will include a CSFB indication. According to a further exemplary embodiment, the CSFB indication is implemented by a new information element, or by a new value of an existing IE, for example as an IE Establishment cause included in an RRC CONNECTION REQUEST of the RRC Establishment procedure. Alternatively, the CSFB indication may be included in another required message of the RRC Establishment procedure, such as e.g. in an RRC CONNECTION SETUP COMPLETE.

However, other exemplary embodiments relate to a transfer of a user equipment from a first radio access network to a second radio access network with a different radio access technology, when the UE has not entered the first radio access network explicitly due to a CSFB, but due to e.g. a bad radio coverage.

Figure 2:
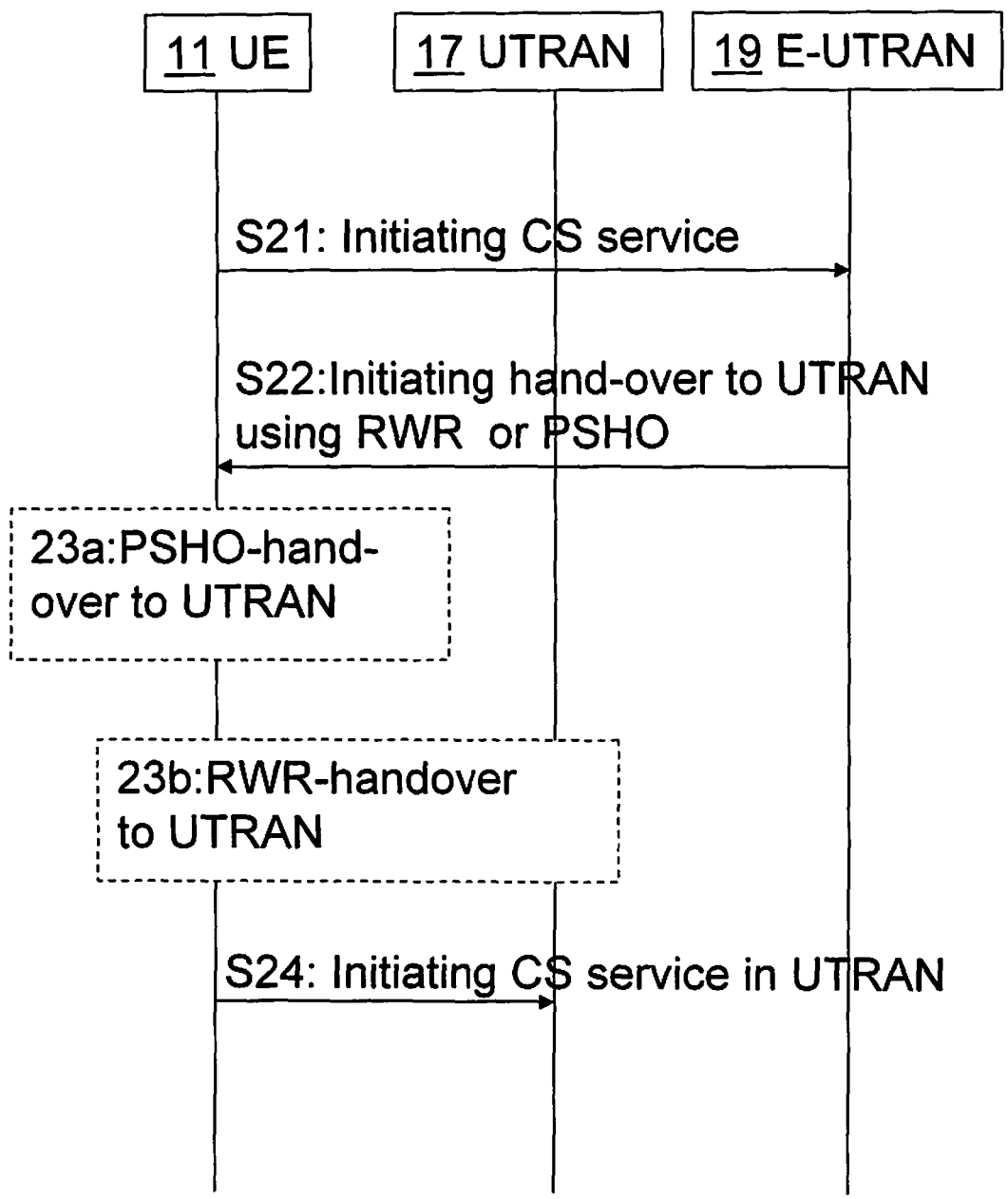
FIG. 2 is a signalling diagram schematically illustrating an exemplary transfer to a UTRAN, when a UE requests a CS-service.

FIG. 2 is a signalling diagram schematically illustrating an exemplary hand-over, i.e. a transfer, to a UTRAN from an E-UTRAN, when the UE requests a CS-service. In signal S21, the UE requests a CS-service, either as a Mobile originating or a Mobile terminating CS-service, and the UE may be in an Idle or in a Connected mode. In signal S22, the eNodeB of the E-UTRAN decides to initiate a CSFB (Circuit-Switched Fall-Back) to UTRAN, using a PSHO (Packet-Switched Hand-Over) or an RWR (RRC Release with Redirect), depending e.g. on whether or not the UE supports the PSHO, and on operator policies, as indicated e.g. in a conventional SPID-value (Subscriber Profile ID-value) obtained by the eNodeB from the core network.

In case the CSFB uses a PSHO, the UE performs a PSHO to UTRAN, in step 23a, wherein the UE tunes to pre-allocated PS resources. In case the CSFB uses an RWR, the UE performs an RWR to UTRAN, in the alternative step 23b, wherein the UE performs a cell selection and sends an RRC Connection establishment to an RNC of the UTRAN. According to an exemplary embodiment, the UE includes a CSFB-indication in the RRC Connection establishment. Next, in signal S24, the UE requests a CS service establishment in the UTRAN. One or more packet-switched data sessions (not illustrated in the figure) may also be established at any time during the CS service.

Figure 3:
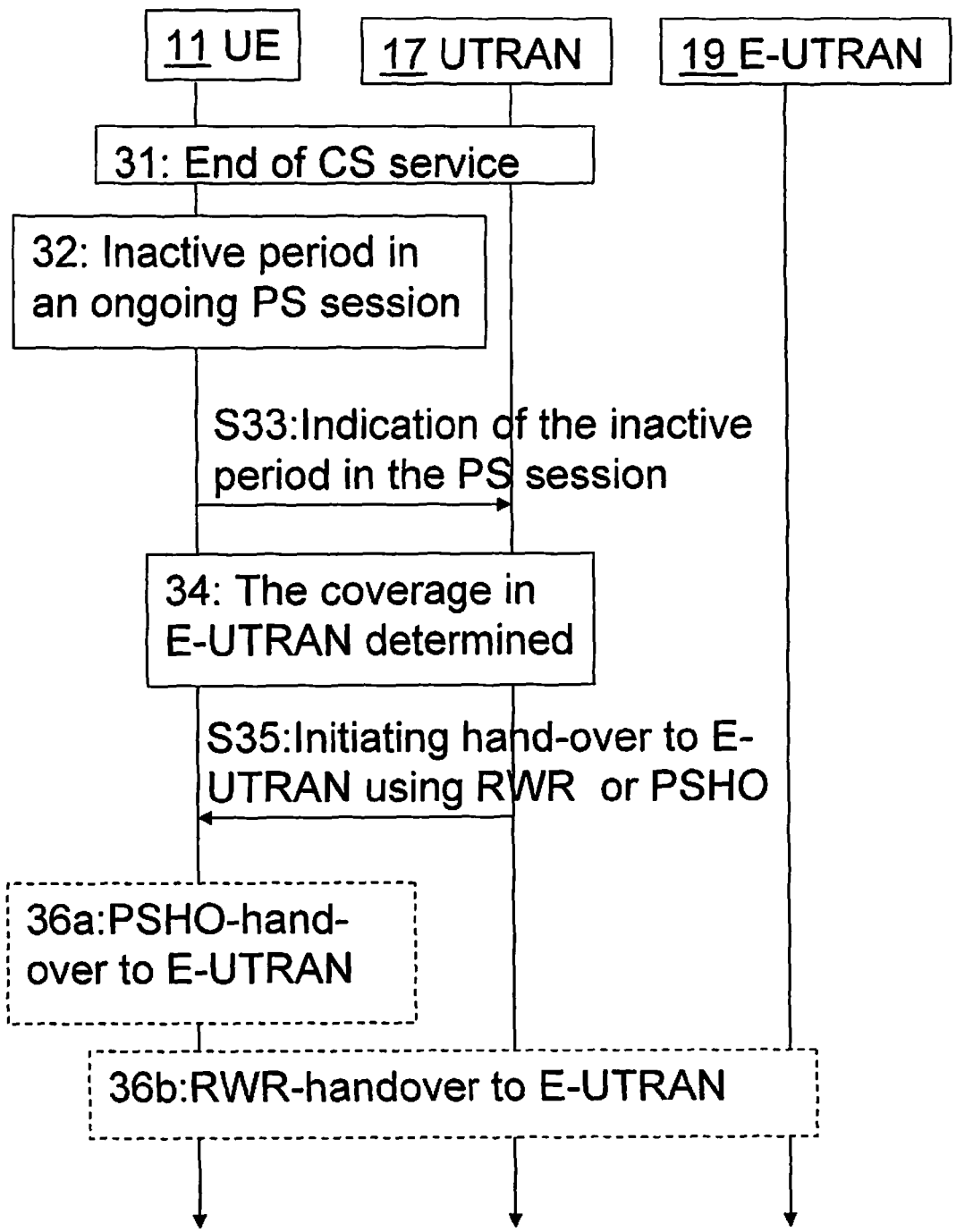
FIG. 3 is a signalling diagram schematically illustrating a UE transferring back to the E-UTRAN, according to an exemplary embodiment.

FIG. 3 is a signalling diagram schematically illustrating an exemplary transfer of the UE back to the E-UTRAN, after the end of the CS service. In step 31, the CS service, received by the UE in the UTRAN, ends. When a CS service is requested by a User Equipment, the core network initiates a set-up of a RAB (Radio Access Bearer) for the CS service, and the RAB is released when the CS service ends. Thus, the end of a CS service may be detected as a release of the Radio Access bearer for the CS service.

After the end of the CS service, and in case no packet-switched data session is ongoing, the UE will go to Idle mode and perform a cell reselection using e.g. dedicated priorities. (Not illustrated in the figure.)

However, in case a packet-switched data session is ongoing, the user equipment is in an active mode, in a CELL_DCH-state or a CELL_FACH-state. In this case the user equipment will track the data applications in order to find, in step 32, a suitable time for returning to E-UTRAN, i.e. a point in time when the UE is not expecting to receive or send any PS data packets. At this point in time, the UE will send, in signal S33, an indication of an inactive period in an ongoing PS data session to a network node in the UTRAN.

According to an exemplary embodiment, this indication may also include a CSFB indication, the indications being included e.g. as a combined cause value in an existing RRC SIGNALLING CONNECTION RELEASE INDICATION.

A transfer (e.g. a hand-over) of a UE to an E-UTRAN also requires that the UE has radio coverage in the E-UTRAN. Thus, the LTE radio coverage could be measured by the UE before the hand-over is performed, and the radio coverage measurements can be initiated by the RNC or by the UE itself. Alternatively, a faster, so-called "blind" hand-over, may be performed, without any separate radio coverage measurements, wherein the blind hand-over will only succeed if the UE has LTE radio coverage.

Thus, in step 34, the LTE coverage is determined, and if the UE has LTE coverage, a network node in UTRAN initiates a transfer of the UE to E-UTRAN, in signal S35, using PSHO or RWR, depending e.g. on UE capabilities. In step 35a, a PSHO to E-UTRAN is performed, and in the alternative step 35b, a RWR to E-UTRAN is performed.

Figure 4:
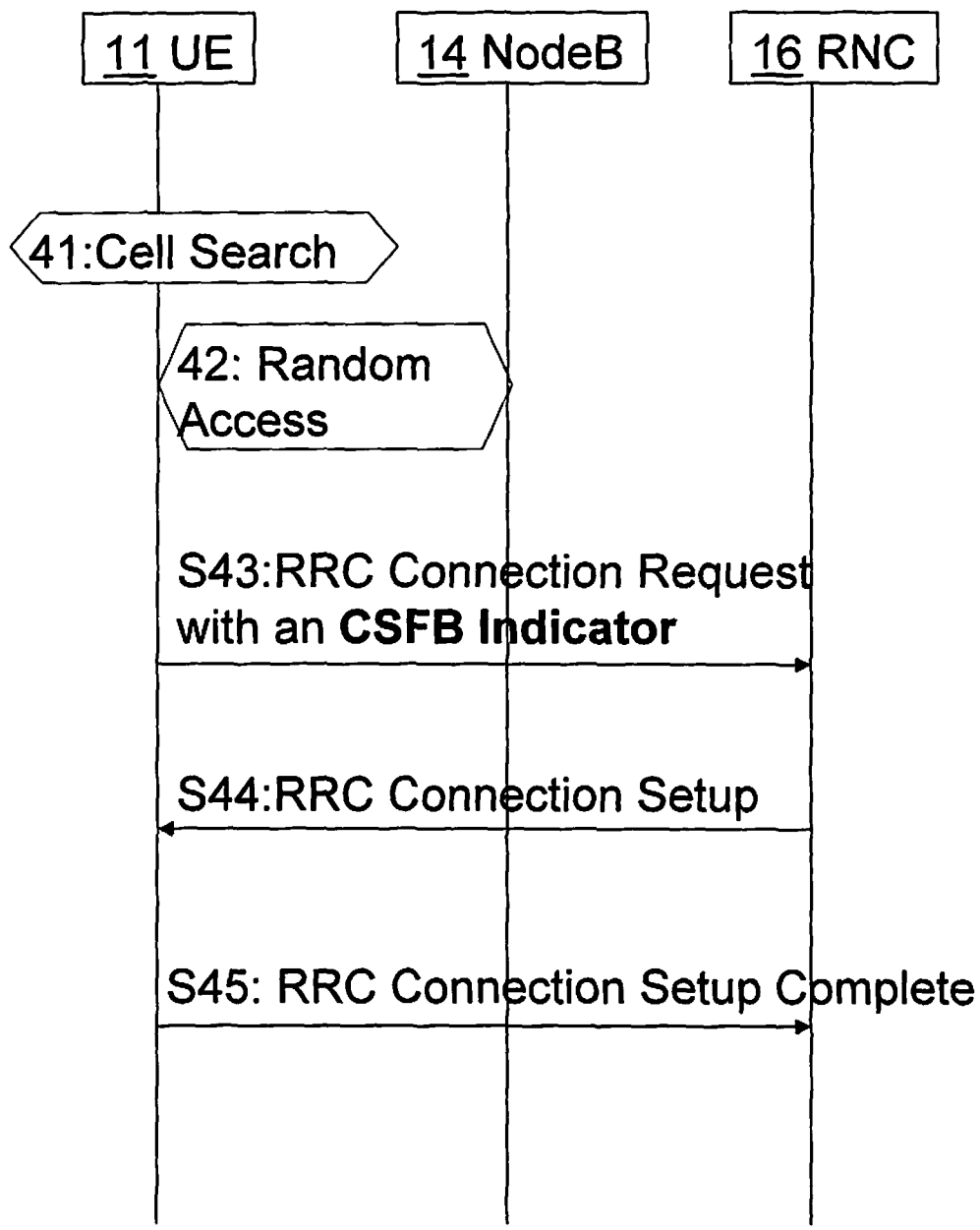
FIG. 4 is a signalling diagram illustrating a RRC Connection Request to a network node, i.e. an RNC, the Request including an CSFB Indicator.

FIG. 4 is a signalling diagram illustrating an exemplary RRC Connection including a CSFB Indicator to an RNC. In a conventional CSFB with RWR, a standardized UTRAN RRC Connection Establishment-procedure takes place when a UE 11 moves to a UTRAN from the E-UTRAN. This RRC Connection Establishment-procedure is triggered by the UE sending an RRC Connection Request with an establishment cause. According to an exemplary embodiment, information is added within this procedure for informing the RNC that the UE enters UTRAN due to CSFB. FIG. 4 shows an example of how this information may be added, i.e. by an CSFB establishment cause value in the RRC Connection Request. The steps 41 and 42 in FIG. 4 indicates the preceding Cell Search and the Random Access to a NodeB 14 of the UTRAN. Signal S43 is the RRC Connection Request to the RNC 16 of the UTRAN, and this Request is provided with the CSFB Indicator. Signal S44 is an RRC Connection Set-up from the RNC to the UE, and signal S45 is a RRC Connection Setup complete returned to the RNC. According to this figure, the CSFB indication is added to the RRC Connection Request. However, the CSFB information may alternatively be added e.g. to the RRC Connection Setup Complete instead.

Figure 5A:
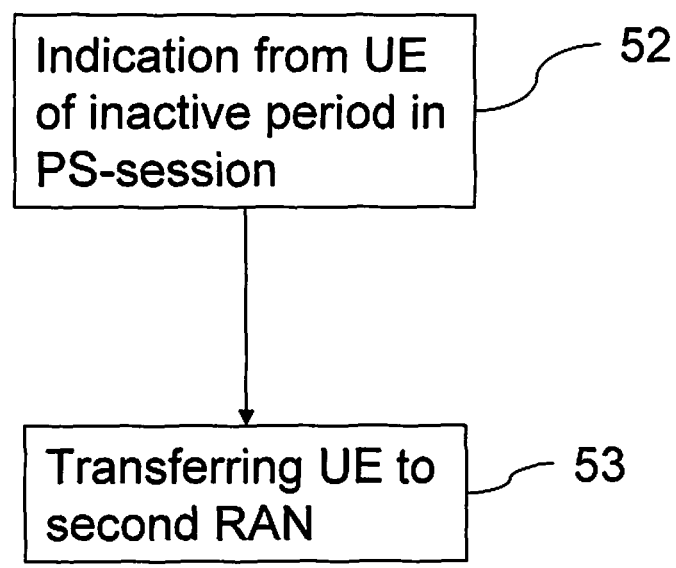
FIG. 5a is a flow diagram schematically illustrating a network node transferring a UE from a first radio access network to a second radio access network, according to an exemplary embodiment.

FIG. 5a is a flow diagram schematically illustrating a network node of a first radio access network, e.g. an RNC of a UTRAN, transferring a user equipment to a second radio access network, e.g. an E-UTRAN, according to an exemplary embodiment. The second radio access network has a different radio access technology than the first radio access network. In step 52, the network node receives an indication in a message from the user equipment, the indication indicating an inactive period in an ongoing packet-switched data session. After receiving this indication, the network node transfers the user equipment to the second radio access network, in step 53, as a result of said indication, using e.g. PSHO or RWR.

Figure 5B:
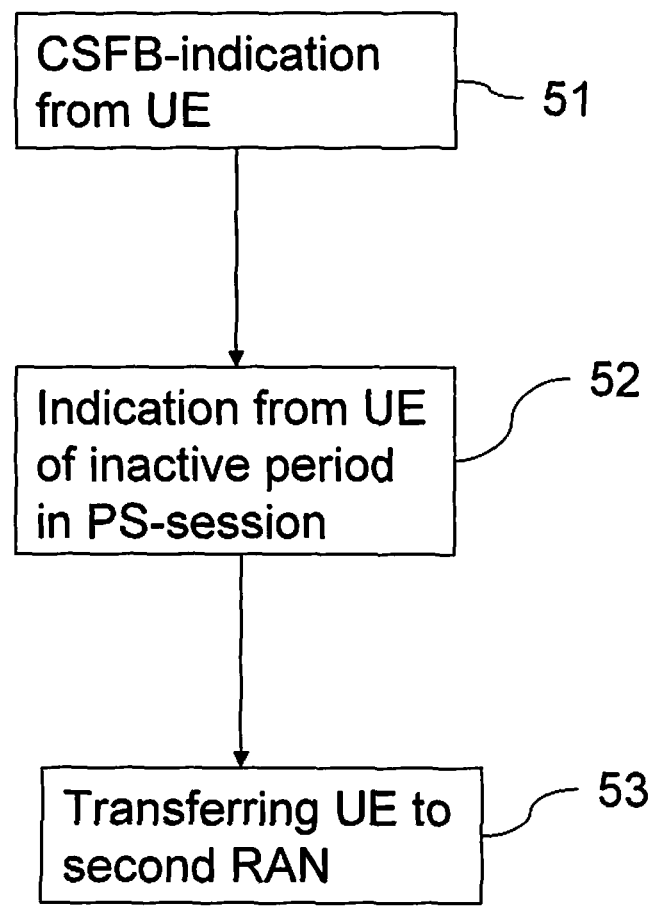
FIG. 5b is a flow diagram schematically illustrating a network node transferring a UE to the second radio access network, according to another exemplary embodiment.

FIG. 5b is a flow diagram schematically illustrating a network node of a first radio access network, e.g. an RNC of a UTRAN, transferring a user equipment to second radio access network, e.g. an E-UTRAN, according to an further exemplary embodiment, the second radio access network having a different radio access technology than the first radio access network. According to this exemplary embodiment, the UE entered the first radio access network due to a circuit switched fallback, and the network node received a CSFB indication from the UE, in step 51, when the UE entered UTRAN, in order to inform the network node that the UE entered due to a CSFB. If the UE entered the UTRAN by a PSHO, the CSFB may have been an IE, indicating CSFB, within a RANAP Relocation Request, and if the UE entered the UTRAN by an RWR, a CSFB indication may have been included in the RRC Connection Request, as illustrated in FIG. 4, and described in the associated description text. In step 52, the network node receives an indication in a message from the user equipment, the indication indicating an inactive period in an ongoing packet-switched data session. After receiving this indication, the network node transfers the user equipment to the second radio access network, in step 53, as a result of the indication of an inactive period in an ongoing packet-switched data session, and further based on the received CSFB indication, using e.g. PSHO or RWR.

Figure 5C:
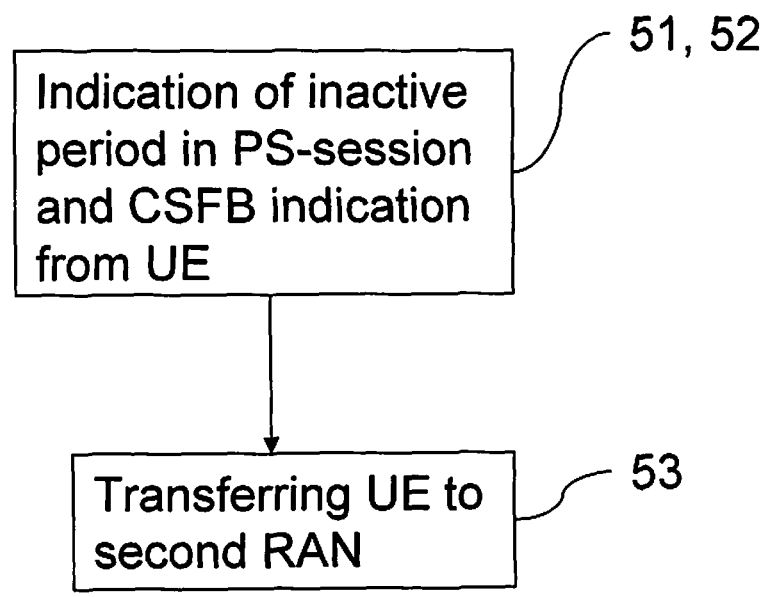
FIG. 5c is a flow diagram schematically illustrating a network node transferring a UE to the second radio access network, according to still another exemplary embodiment.

FIG. 5c is a flow diagram schematically illustrating a network node of a first radio access network, e.g. an RNC of a UTRAN, transferring a user equipment to second radio access network, e.g. an E-UTRAN, according to a still further exemplary embodiment, the second radio access network having a different radio access technology than the first radio access network. According to this exemplary embodiment, the UE entered the first radio access network due to a circuit switched fallback. In the combined step 51, 52, the network node receives an indication in a message from the user equipment, the indication indicating an inactive period in an ongoing packet-switched data session, and also an indication that the UE entered the first radio access network due to a CSFB. After receiving this message, comprising a combined indication, the network node transfers the user equipment to the second radio access network, in step 53, using e.g. PSHO or RWR, as a result of the indication indicating an inactive period in an ongoing packet-switched data session, and further based on the received CSFB indication.

Figure 6A:
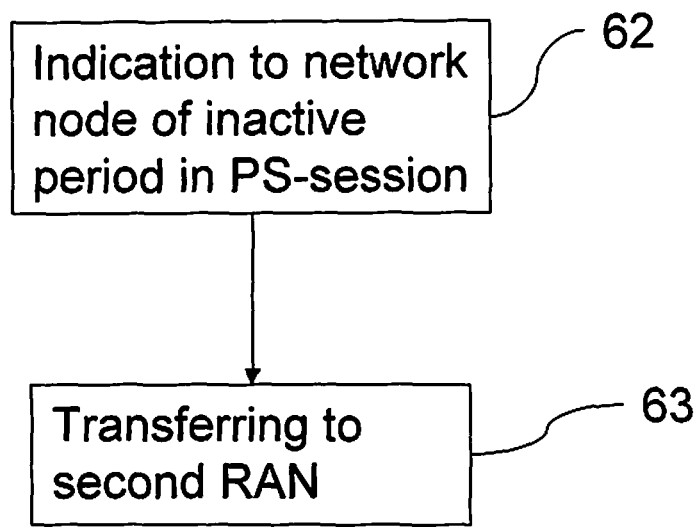
FIG. 6a is a flow diagram schematically illustrating a UE transferring from a first radio access network to a second radio access network, according to an exemplary embodiment.

FIG. 6a is a flow diagram schematically illustrating a user equipment transferring from a first radio access network, e.g. an RNC of a UTRAN, to a second radio access network, e.g. an E-UTRAN, according to an exemplary embodiment, wherein the second radio access network has a different radio access technology than the first radio access network. In step 62, the user equipment sends an indication in a message to the network node of the first radio access network, the indication indicating an inactive period in an ongoing packet-switched data session. In step 63, the user equipment transfers to the second radio access network, after receiving a transfer request from a network node as a result of the indication, using e.g. PSHO or RWR.

According to another exemplary embodiment, the handover is preceded by the UE sending a CSFB indication to the RNC when the UE enters UTRAN, for informing the RNC that the UE enters due to a CSFB. If the UE enters the UTRAN by a PSHO, the CSFB may be an IE indicating CSFB within a RANAP RELOCATION REQUEST, and if the UE enters the UTRAN by an RWR, a CSFB indication may be included in the RRC CONNECTION REQUEST, as illustrated in FIG. 4, and described in the associated description text.

Figure 6B:
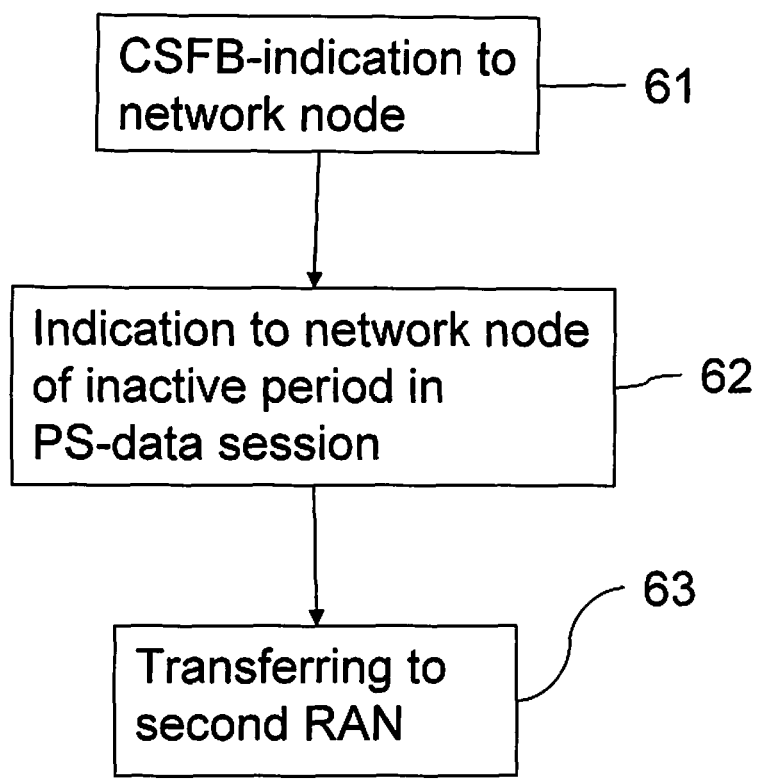
FIG. 6b is a flow diagram schematically illustrating a UE transferring to the second radio access network, according to another exemplary embodiment.

FIG. 6b is a flow diagram schematically illustrating a UE transferring from a first radio access network, e.g. an RNC of a UTRAN, to a second radio access network, e.g. an E-UTRAN, according to another exemplary embodiment, wherein the second radio access network has a different radio access technology than the first radio access network. According to this exemplary embodiment, the transfer is preceded by the UE sending a CSFB indication to the network node when the UE enters the first radio access network, in step 61, for informing the network that the UE enters due to a CSFB. In step 62, the user equipment sends an indication in a message to a network node of the first radio access network, the indication indicating an inactive period in an ongoing packet-switched data session. In step 63, the user equipment transfers to the second radio access network, using e.g. PSHO or RWR, after receiving a transfer request from a network node as a result of the indication indicating an inactive period in an ongoing packet-switched data session, and further based on said received CSFB indication.

Figure 6C:
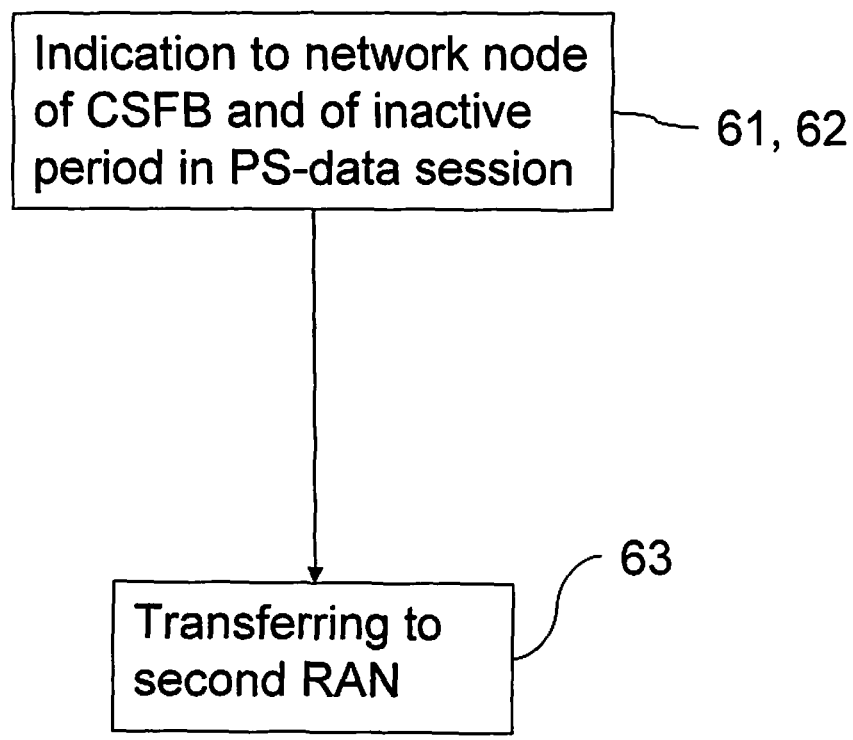
FIG. 6c is a flow diagram schematically illustrating a UE transferring to the second radio access network, according to still another exemplary embodiment.

FIG. 6c is a flow diagram schematically illustrating a user equipment transferring from a first radio access network, e.g. an RNC of a UTRAN, to a second radio access network, e.g. an E-UTRAN, according to a still further exemplary embodiment, wherein the second radio access network has a different radio access technology than the first radio access network. According to this exemplary embodiment, the UE entered the first radio access network due to a circuit switched fallback. In the combined step 61, 62, the user equipment sends an indication in a message from the user equipment, the indication indicating an inactive period in an ongoing packet-switched data session, and a further indication indicating that the user equipment had entered the first radio access network due to a CSFB. In step 63, the user equipment transfers to the second radio access network, using e.g. PSHO or RWR, after receiving a transfer request from a network node as a result of the indication indicating an inactive period in an ongoing packet-switched data session, and further based on the received CSFB indication.

Figure 7A:
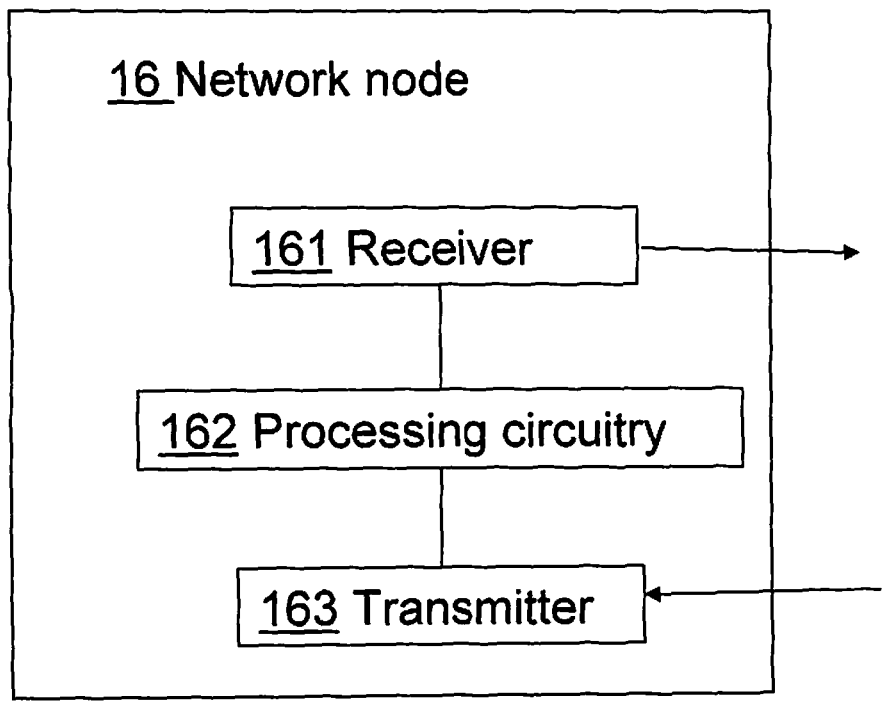
FIGS. 7a and 7b illustrate schematically a network node, according to an exemplary embodiment.

FIG. 7a illustrates schematically an exemplary network node 16, according to exemplary embodiments, e.g. an RNC. The network node is connectable to a first radio access network, e.g. a UTRAN, and is arranged to transfer a user equipment from the first radio access network to a second radio access network, wherein the second radio access network has a different radio access technology than the first radio access network. The network node is provided with suitable communication circuitry, comprising a receiver 161 and a transmitter 163 for communicating with the user equipments via radio base station, e.g. NodeBs, as well as with the core network, wherein the core network typically comprises both a circuit switched service domain and a packet switched service domain.

The receiver 161 is configured to receive a message from a UE, the message comprising an indication of an inactive period in an ongoing packet-switched data session. The network node is further provided with appropriate processing circuitry 162 connected to the receiver 161 and the transmitter 163, the processing circuitry being configured to transfer the user equipment to the second radio access network, as a result of said indication.

According to a further embodiment, the receiver 161 is further configured to receive a CSFB indication from the UE for indicating that the UE entered the first RAN due to a CSFB, and the processing circuitry is configured to transfer the UE to the second RAN further based on said CSFB indication.

According to alternative embodiments, the receiver 161 is configured to receive said CSFB indication in connection with the indication of an inactive period in an ongoing PS data session, or in connection with the UE entering the first RAN, e.g. in an RRC Connection Request.

Figure 7B:
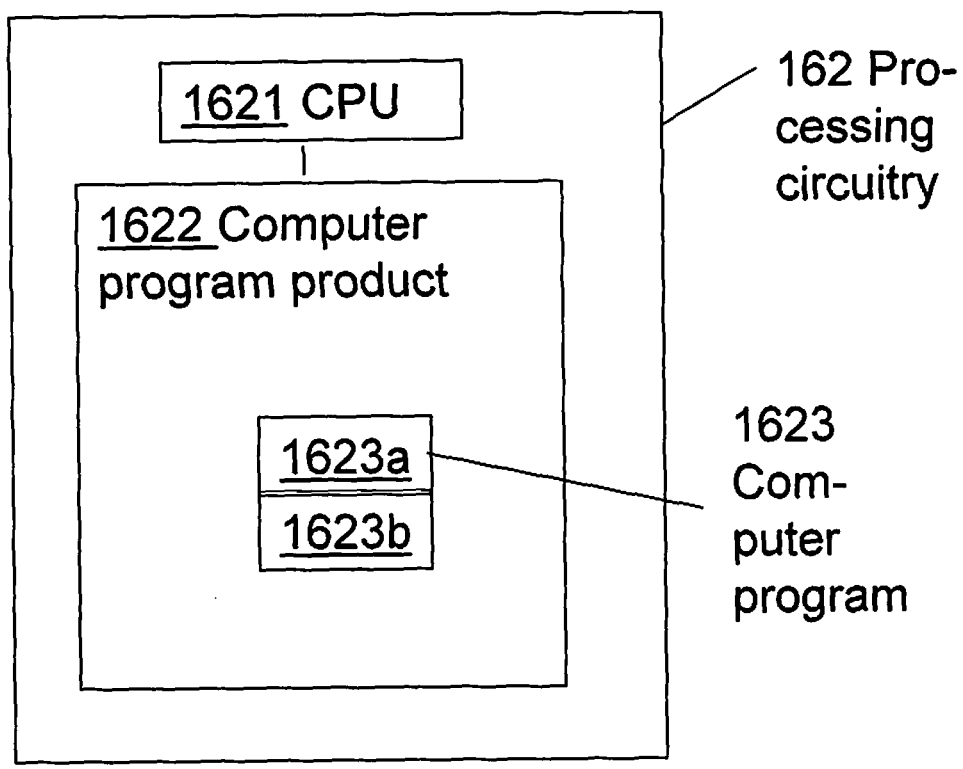

FIG. 7b schematically illustrates the processing circuitry 162, as illustrated in FIG. 7a. The processing circuitry comprises a CPU 1621, which may be a single unit or a plurality of units. Furthermore, the processing circuitry comprises at least one computer program product 1622, in the form of a non-volatile memory, e.g. an EEPROM (Electrically Erasable Programmable Read-Only Memory), a flash memory or a disk drive. The computer program product 1622 comprises a computer program 1623 comprising computer program modules 1623a,b, which when run on the network node 16 causes the CPU 1621 to perform the steps performed in conjunction with FIG. 5a.

Hence, in the exemplary embodiment illustrated in FIG. 7b, the code means in the computer program 1623 comprises a receiving module 1623a and a transferring module 1623b. The modules 1623a and 1623b essentially perform the steps of the flow in FIG. 5a to emulate the network node described in connection with FIG. 7a. However, one or more of the modules of the code means may in alternative embodiments be implemented partly as hardware circuits.

FIG. 8a illustrates schematically an exemplary user equipment 11, according to exemplary embodiments, and the UE is connectable to both a first radio access network and to a second access network having different radio access technology, e.g. to a UTRAN and to an E-UTRAN. The user equipment, UE, is arranged to be transferred from the first radio access network to the second access network by a network node 16 of the first radio access network.

The UE is provided with suitable communication circuitry, comprising a transmitter 111 and a receiver 113, for wireless communication with a radio base station, e.g. a NodeB or an eNodeB. The transmitter 111 is configured to send a message to the network node 16, the message comprising an indication of an inactive period in an ongoing packet switched data session. The receiver 113 is configured to receive a transfer request from the network node to transfer to the second radio access network, the request received as a result of said indication.

The UE is further provided with appropriate processing circuitry 112 connected to the receiver and the transmitter, and configured to transfer the UE to the second radio access network, after receiving the transfer request from the network node.

According to a further embodiment, the transmitter 111 is further configured to send a CSFB indication to the network node for indicating that the UE entered the first RAN due to a CSFB, wherein said transfer request received from the network node 16 is further based on said CSFB indication.

According to alternative embodiments, the transmitter 111 is configured to send said CSFB indication in connection with the indication of an inactive period in an ongoing PS data session, or in connection with the UE entering the first RAN, e.g. in an RRC Connection Request.

FIG. 8b schematically illustrates the processing circuitry 112, as illustrated in FIG. 8a. The processing circuitry comprises a CPU 1121, which may be a single unit or a plurality of units. Furthermore, the processing circuitry comprises at least one computer program product 1122, in the form of a non-volatile memory, e.g. an EEPROM (Electrically Erasable Programmable Read-Only Memory), a flash memory or a disk drive. The computer program product 1122 comprises a computer program 1123 comprising computer program modules 1123a, b, which when run on the User Equipment 11 causes the CPU 1121 to perform the steps described earlier in conjunction with FIG. 6a. Hence, in the exemplary embodiment illustrated in FIG. 8b, the code means in the computer program 1123 comprises a transmitting module 1123a and a transferring module 1123b. The modules 1123a and 1123b essentially perform the steps of the flow in FIG. 6a to emulate the network node described in connection with FIG. 8a. However, one or more of the modules of the code means may in alternative embodiments be implemented partly as hardware circuits.

It should also be noted that the above-described network node 16 and user equipment 11 may be implemented by physical or logical entities using software functioning in conjunction with a programmed microprocessor or general purpose computer, and/or using an application specific integrated circuit (ASIC). They may further include suitable internal and external storage devices, a processor or multiple processor cores, as well as appropriate communication interfaces, including hardware and software capable of performing the necessary modulating, coding, filtering and the like, as well as demodulating and decoding to process such signals.

It is an advantage with the described embodiments to enable a user equipment to return a radio access network with a different RAT, e.g. to an E-UTRAN, when e.g. a CS service provided to the UE in a radio access network with a CS capable RAT, e.g. an UTRAN, is terminated, even if the user equipment is very active, and does not enter the idle mode.

However, the above mentioned and described embodiments are only given as examples and should not be limiting to the present invention, since other solutions, uses, objectives, and functions are apparent within the scope of the invention as claimed in the accompanying patent claims.

The invention claimed is:

1. A method in a network node of a first radio access network for transferring a user equipment, UE, from the first radio access network to a second radio access network, the first radio access network configured for circuit-switched and packet-switched communication, the second radio access network having a different radio access technology, RAT, than the first radio access network, the method comprising:
 terminating a circuit-switched communication session with the UE;
 receiving, at the network node, a message from the UE, the message comprising an indication of an inactive period in an ongoing packet-switched data session; and
 transferring the UE to the second radio access network after the network node receives the indication from the UE.

2. The method according to claim 1, wherein said receiving further comprises receiving a further indication in a message from the UE, the further indication indicating that the UE entered the first radio access network due to a circuit switched fallback, CSFB, and wherein said transferring of the UE to the second radio access network is further based on said received further indication.

3. The method according to claim 2, wherein said further indication from the UE is received in connection with the indication of an inactive period in an ongoing packet-switched data session.

4. The method according to claim 2, wherein said further indication from the UE is received in connection with the UE entering the first radio network.

5. The method according to claim 4, wherein said further indication is received from the UE in a Radio Resource Control, RRC, Connection Request, wherein the RRC Connection Request comprises an indication that the request is caused by a circuit switched fallback to the first radio network.

6. A method in a user equipment, UE, for transferring from a first radio access network to a second radio access network, the first radio access network configured for circuit-switched and packet-switched communication, the second radio access network having a different radio access technology, RAT, than the first radio access network, the method comprising:
   after termination of a circuit-switched communication session with a network node of the first radio access network,
   transmitting a message to the network node of the first radio access network, the message comprising an indication of an inactive period in an ongoing packet switched data session; and
   transferring to the second radio access network after receiving a transfer request from the network node of the first radio access network, said transfer request received after the network node receives the indication from the UE.

7. The method according to claim 6, wherein said transmitting further comprises transmitting a further indication in a message to the network node of the first radio access network, the further indication indicating that the UE entered the first radio access network due to a circuit switch fallback, CSFB, wherein said transfer request, as received from the network node, is further based on said transmitted further indication.

8. The method according to claim 7, wherein said further indication is transmitted to the network node in connection with the indication of an inactive period in an ongoing packet-switched data session.

9. The method according to claim 7, wherein said further indication is transmitted to the network node in connection with the UE entering the first radio network.

10. The method according to claim 9, wherein said further indication is transmitted to the network node in a Radio Resource Control, RRC, Connection Request, wherein said request comprises an indication that the request is caused by a circuit switched fallback.

11. A network node connectable to a first radio access network, the first radio access network configured for circuit-switched and packet-switched communication, the network node arranged to transfer a user equipment, UE, from the first radio access network to a second radio access network, the second radio access network having a different radio access technology than the first radio access network, the network node comprising:
   a receiver configured to, after termination of a circuit-switched communication session with the UE, receive a message from, the UE, the message comprising an indication of an inactive period in an ongoing packet-switched data session; and
   a processing circuitry configured to transfer the UE to the second radio access network after the network node receives the indication from the UE.

12. The network node according to claim 11, wherein said receiver is further configured to receive a further indication in a message from the UE, the further indication indicating that the UE entered the first radio access network due to a circuit switched fallback, CSFB, and wherein the processing circuitry is further configured to transfer the UE to the second radio access network based on said received further indication.

13. The network node according to claim 12, wherein said receiver is configured to receive said further indication in connection with the indication of an inactive period in an ongoing packet-switched data session.

14. The network node according to claim 12, wherein said receiver is configured to receive said further indication in connection with the UE entering the first radio network.

15. The network node according to claim 14, wherein said receiver is configured to receive said further indication in a Radio Resource Control, RRC, Connection Request, wherein the RRC Connection Request comprises an indication that the request is caused by a circuit switched fallback to the first radio network.

16. A user equipment connectable to a first radio access network and to a second radio access network the first radio access network configured for circuit-switched and packet-switched communication, and arranged to be transferred from the first radio access network to the second radio access network by a network node of the first radio access network, the second radio access network having a different radio access technology than the first radio access network, the user equipment, UE, comprising:
   a transmitter configured to, after termination of a circuit-switched communication session with the network node of the first radio access network, send a message to the network node of the first radio access network, the message comprising an indication of an inactive period in an ongoing packet switched data session;
   a receiver configured to receive a transfer request from the network node to transfer to the second radio access network, the transfer request received after the network node receives the indication from the UE; and
   a processing circuitry configured to transfer the UE to the second radio access network after receiving the transfer request.

17. The user equipment according to claim 16, wherein the transmitter is further configured to send a further indication in a message to the network node of the first radio access network, the further indication indicating that the UE entered the first radio access network due to a circuit switch fallback, CSFB, wherein said transfer request, as received from the network node, is further based on said further indication.

18. The user equipment according to claim 17, wherein said transmitter is configured to send said further indication in connection with the indication of an inactive period in an ongoing packet data session.

19. The user equipment according to claim 17, wherein said transmitter is configured to send said further indication in connection with the UE entering the first radio access network.

20. The user equipment according to claim 19, wherein said transmitter is configured to send said further indication in a Radio Resource Control, RRC, Connection request, wherein said request is caused by a circuit switched fallback.

* * * * *